United States Patent
Dietz et al.

(10) Patent No.: US 7,333,773 B2
(45) Date of Patent: Feb. 19, 2008

(54) COORDINATION OF CELLULAR TELEPHONES IN A RESIDENTIAL AREA TO OBVIATE NEED FOR WIRED RESIDENTIAL SERVICE

(75) Inventors: Timothy Alan Dietz, Austin, TX (US); Lane Thomas Holloway, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 10/942,448

(22) Filed: Sep. 16, 2004

(65) Prior Publication Data

US 2006/0057961 A1  Mar. 16, 2006

(51) Int. Cl.
*H04B 7/00* (2006.01)
*H04B 1/38* (2006.01)
*H04M 1/60* (2006.01)

(52) U.S. Cl. ............... 455/41.2; 455/567; 455/417; 455/463; 455/518; 455/555; 379/171; 379/211.03

(58) Field of Classification Search ............... 455/41.2, 455/567, 417, 463, 518, 555; 379/171, 211.03, 379/211
See application file for complete search history.

(56) References Cited

U.S. PATENT DOCUMENTS

| | | | | |
|---|---|---|---|---|
| 5,995,500 | A * | 11/1999 | Ma et al. ............... | 370/337 |
| 2002/0132582 | A1* | 9/2002 | Mooney ............... | 455/41 |
| 2003/0083061 | A1* | 5/2003 | Robinson et al. ............... | 455/425 |
| 2004/0128013 | A1* | 7/2004 | Blawat et al. ............... | 700/100 |
| 2004/0151295 | A1* | 8/2004 | Gilbert ............... | 379/211.02 |
| 2004/0185839 | A1* | 9/2004 | Seligmann et al. ............... | 455/417 |
| 2004/0213212 | A1* | 10/2004 | Reding et al. ............... | 370/352 |
| 2004/0253924 | A1* | 12/2004 | Acampora ............... | 455/41.2 |
| 2005/0070261 | A1* | 3/2005 | Belmont et al. ............... | 455/415 |
| 2005/0078608 | A1* | 4/2005 | Gluck ............... | 370/254 |
| 2005/0096029 | A1* | 5/2005 | Pelaez et al. ............... | 455/419 |
| 2005/0143057 | A1* | 6/2005 | Shiraga et al. ............... | 455/417 |
| 2005/0215243 | A1* | 9/2005 | Black et al. ............... | 455/417 |

* cited by examiner

*Primary Examiner*—William Trost
*Assistant Examiner*—Christopher M Brandt
(74) *Attorney, Agent, or Firm*—Janis E. Clements

(57) ABSTRACT

A comprehensive method for coordinating cellular phones in a residential area to obviate the need for wired residential service. The present invention includes coordinating a set of wireless devices in a residential area to be able to receive a call directed to a user's cellular telephone. Said wireless devices can have different numbers and be serviced by different providers than the user's cellular telephone. Peer-to-peer relationships are formed between associated wireless communications devices, similar to IEEE 802.11 peer-to-peer relationships. A call could also be answered by another cellular telephone, or other device, such as a computer. All communicating handsets of associated wireless communications devices could join the call. The present invention would prevent a user from missing any incoming calls while at the user's residence. The present invention would also allow a user to receive calls at the user's residence on any associated communications device without the need for wired residential service.

3 Claims, 4 Drawing Sheets

COORDINATION OF CELLULAR TELEPHONES IN A RESIDENTIAL AREA TO OBVIATE NEED FOR WIRED RESIDENTIAL SERVICE

TECHNICAL FIELD

The present invention relates to telecommunications through wireless cellular telephone systems, and particularly to the use of such systems in a residential setting to obviate the need for wired residential service.

BACKGROUND OF RELATED ART

With the globalization of business, industry and trade wherein transactions and activities within these fields have been changing from localized organizations to diverse transactions over the face of the world, the telecommunications industries have, accordingly, been expanding rapidly. Wireless telephones and particularly, cellular telephones have become so pervasive that their world wide number is in the order of hundreds of millions. While the embodiment to be subsequently described relates to cellular telephones, the principles of the invention would be applicable to any wireless personal communication device that could be used to communicate in a cellular telecommunications system. The principles of this invention could also apply to any IEEE 802.11 or similarly capable (i.e., Bluetooth, etc.) and attached computers in the residential setting.

Despite the rapid expansion and the proliferation of wireless telephones, and, particularly, cellular telephones and networks, the industry is in a state wherein available cellular telecommunication resources are expanding more rapidly than consumer demand. As a result, the industry is seeking new and expanded uses for its products. The present invention offers such an expanded application for wireless cellular telephone technology to provide a user the ability to receive telephone calls on a designated wireless telecommunications device, such as a cellular phone, PDA, laptop computer, or other such wireless telecommunications device. The present invention involves any number of peer-to-peer pairings that are established for continuous communication between the wireless communications devices, similarly to an IEEE 802.11 peer-to-peer wireless network. With peer-to-peer networking, a wireless network can use an access point, or base station. The access point acts like a hub, providing connectivity for the wireless communications devices, and can connect the wireless LAN to a wired LAN, allowing wireless communications devices access to LAN resources. Wireless networking hardware requires the use of underlying technology that works with radio frequencies as well as data transmission. The most commonly used standard is 802.11, which is produced by the Institute of Electrical Engineers (IEEE), and is a standard that defines all aspects of Radio Frequency Wireless networking. Since most wireless networking hardware supports the 802.11 standard, most wireless communications devices can inter operate.

SUMMARY OF THE PRESENT INVENTION

The present invention provides for coordination of a set of wireless devices in a residential setting to obviate the need for wired residential service. The user is able to receive telephone calls directed to a first wireless telephonic device on another wireless device at the residence having the same or a different number, and having the same or a different service provider. The invention forms a network among all wireless telephonic devices within a limited range so that any such device receiving a call could signal all other associated devices to ring and to have the capacity to answer the call.

Accordingly, in its broadest aspects, the present invention is a system for coordinating a set of wireless devices in a residential area for alerting all devices in the set to receive a call sent to any device in the set. A short range RF broadcast station, such as a cellular tower, in said residential area sends real-time information to devices in said residential area that may or may not be connected to a first device's telephone number to which the information or call was sent. Each of the devices in the set of wireless devices is adapted to receive said short range RF signals from said broadcast station, and has means for identifying information sent from a first device to another device within said RF broadcasting range via said station. The first device has means enabling it to request transmitted information to form a peer-to-peer relationship between said other device and first said device. Means also exist for said other device to accept said request.

Said other device can pass incoming calls to devices within said RF broadcast range. The first device relays the call to associated devices on a short range frequency in use, such as 2.4 GHz or 5.8 GHz unregulated range. All communicating handsets related to said other devices can join a call when said other devices are within the RF broadcast range. However, a privacy feature on said first device and said other devices allows a user the option of limiting which devices can join a call. A call can be answered by such devices as a computer or a VOIP capable device within said RF broadcast range, but would require a signaling mechanism to alert the user of an incoming call.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
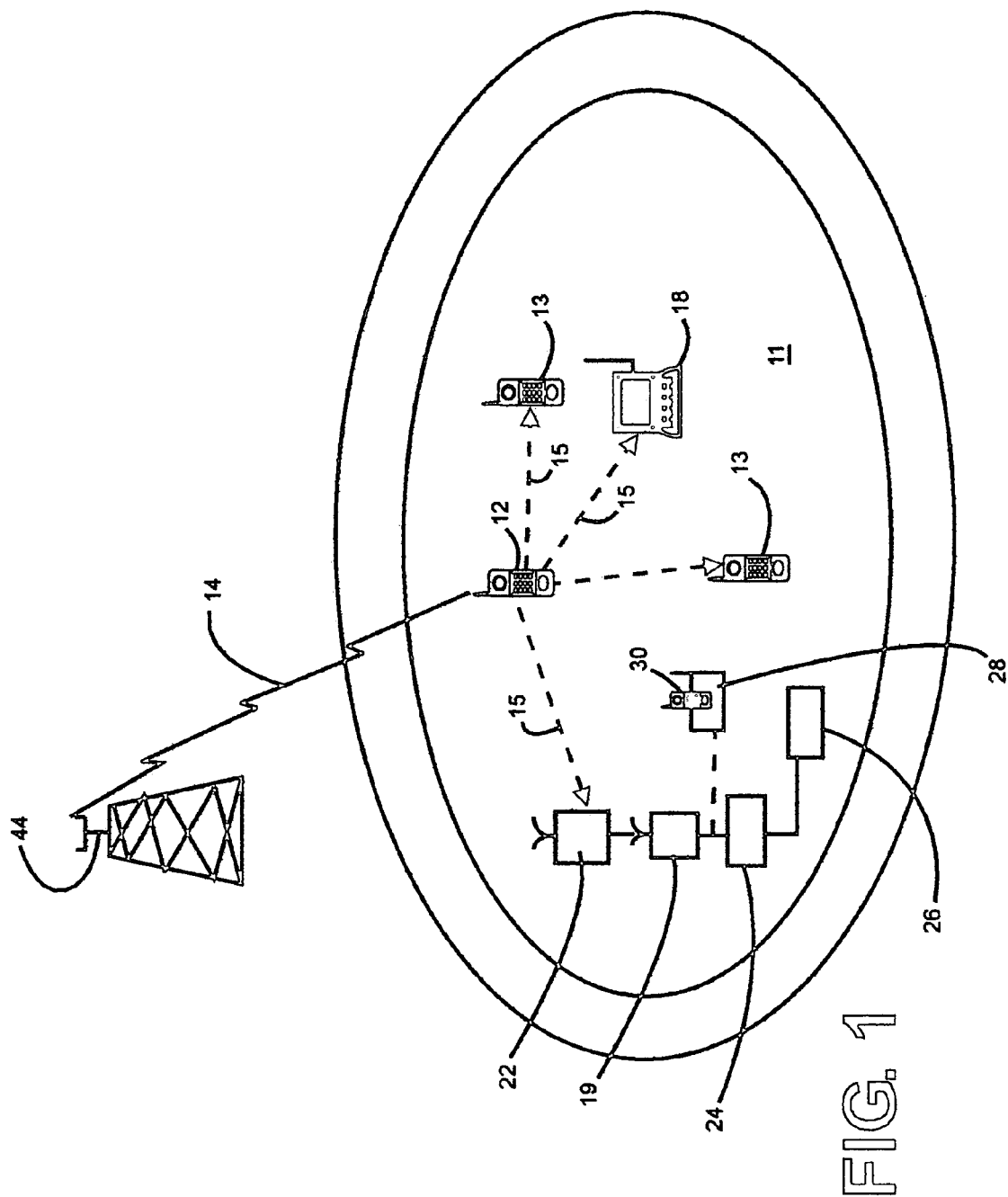
FIG. 1 is a generalized diagrammatic view of a wireless LAN and a communicating Internet portion to illustrate the elements of the present invention.

Referring to FIG. 1, there is provided a generalized diagrammatic view of a wireless LAN and its interconnections to a network, such as the Internet or World Wide Web (Web), so as to illustrate the present invention.

Since we are using a cellular telecommunications system for our illustration, some background description is appropriate here. In the cellular system for the handheld mobile wireless telephone, an area such as a city is broken up into small area cells. Each cell is about 10 square miles in area. Each has its base station that has a tower for receiving/transmitting and a base connected into PTSN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824-894 MHz ranges. Since transmissions between the cell telephone and the cell tower are digital, but the speaker and microphone in the telephone are analog, the cell telephone has to have a D to A converter from the input to the phone speaker, and an A to D converter from the microphone to the output to the cell tower.

In FIG. 1, the wireless LAN is confined to a residential area 11. The LAN includes wireless devices, such as cellular telephones 12, 13, computers with 802.11 or similar capability 18, or VOIP capable equipment 26 sending and receiving wireless radio frequency communications 14 through their respective antennae received and sent via corresponding antenna of IEEE 802.11 B protocol wireless hub 19. Once appropriate contact is established with a tower 44 by a first wireless telephonic device 12, the transmission is via a short range RF broadcast station, such as a cellular tower, at a short range RF broadcast frequency 15 between said first device 12 and other devices, such as other cellular phones 13, a computer 18, or VOIP capable equipment 26. The first device 12 relays an incoming call to other devices 13, 18, 26 on a short range frequency in use, such as 2.4 GHz or 5.8 GHz unregulated range. A call could even be received by a cordless telephone 30 that was not wired for residential service but had a base 28 that was configured to receive short range RF broadcast frequency signals from the first device 12.

When using VOIP equipment 26 to participate in a call as described in this invention, a receiving box 22 that accepts transmissions from the first device 12 and signals user of an incoming call is required. Also required is DSL or some similar modem 24 that would connect the receiving box 22 and the 802.11 B protocol wireless hub 19 to the VOIP equipment 26.

While all handsets of said other devices 13, 18, 26 are capable of joining incoming calls, a privacy feature allows a user to limit the handsets that may join a call. This privacy feature can be activated with any of the devices 12, 13, 18, 26.

Figure 2:
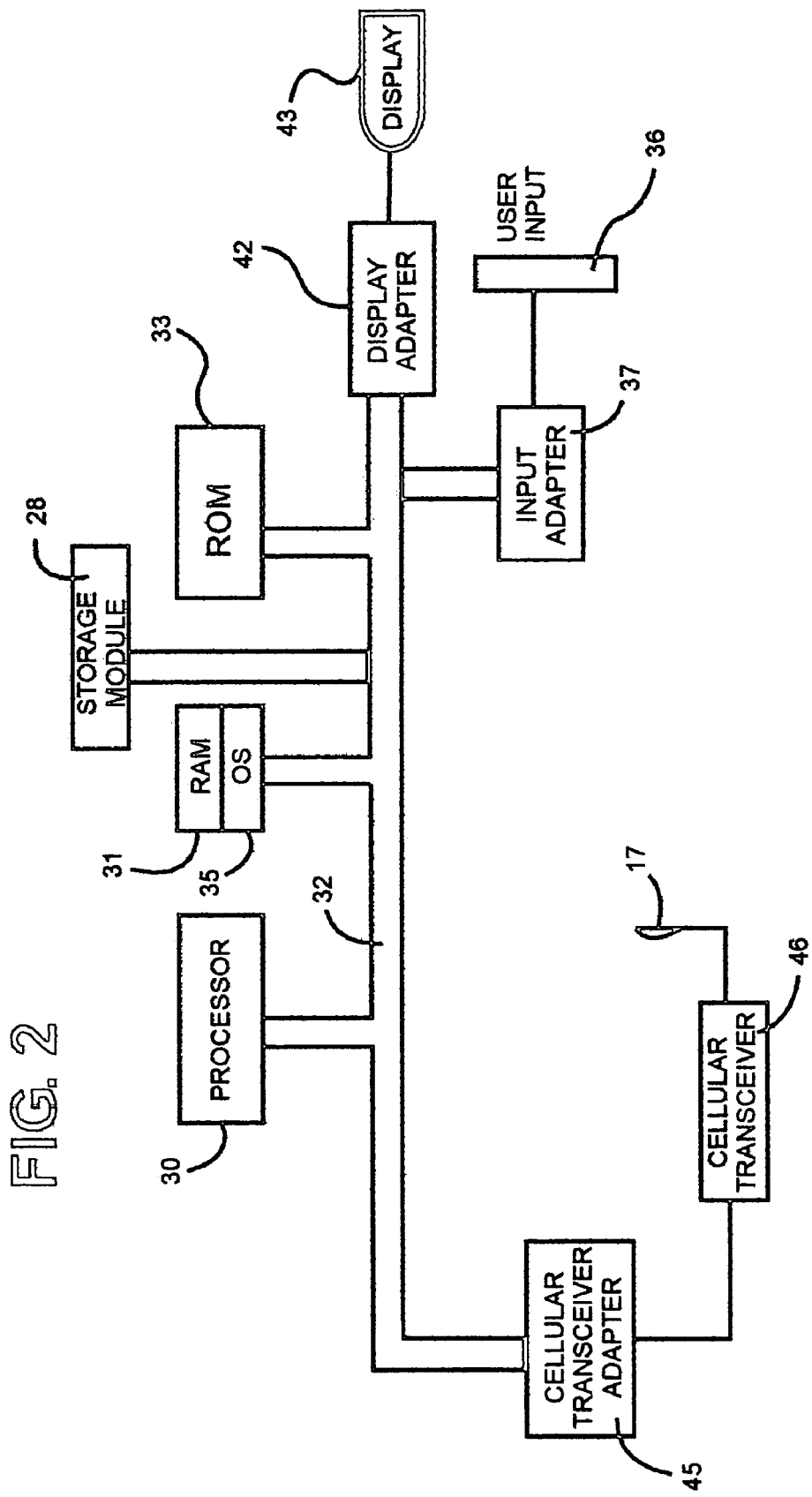
FIG. 2 is a block diagram of a generalized data processing system including a central processor unit that provides an illustration of a wireless network for wireless communications devices in a residential setting wirelessly connected to a cellular base tower.

FIG. 2 shows a typical computer controlled system that may function as a telecommunications system for coordinating a set of wireless devices in a residential area for alerting all devices in the set to receive a call sent to any device in the set that is within RF broadcast range of a particular residence. While FIG. 2 shows a system that would normally be in an automobile, it is understood that any wireless personal device would also perform equivalent standard functions. The telecommunications system may be a conventional system with a central processing unit 30, which in turn is interconnected to various other components by system bus 32. An operating system 35 that runs on a processor 30 in a mobile device provides control and is used to coordinate the functions of the various components of the telecommunications system. The OS 35 is stored in Random Access Memory (RAM) 31. The programs for the various call transferring functions, including those of the present invention, are permanently stored in Read Only Memory (ROM) 33 and moved into and out of RAM 31 to perform their respective functions. The user's designated wireless communications device has a basic display 43 controlled through a display adapter 42 to provide information to the user. Interactively responsive to the display information, the user provides commands, such as call information, to the telecommunications system through a user input 36 initiating from the original caller that may be implemented by standard wireless telephonic device buttons connected via an appropriate input adapter 37 of the originating caller. For example, a call is sent by an originating caller to a user's wireless telephonic device, and the user may not be near the wireless telephonic device when the call is received while the user is at home, causing the user to miss an important call. The present invention allows all wireless communications devices in a particular residential area to ring when the user's first telephonic device was called when the user is within RF broadcasting range of the residence. This invention provides a capability to form a network among all wireless communications devices within a limited range so that any wireless communications device receiving a call could signal all other associated wireless communication devices to ring and to answer a call even if the call was sent to a different telephone number than the one for a particular answering device. The other devices can also be serviced by different providers. This invention allows a user to participate in calls while at home without having wired residential service.

Figure 3:
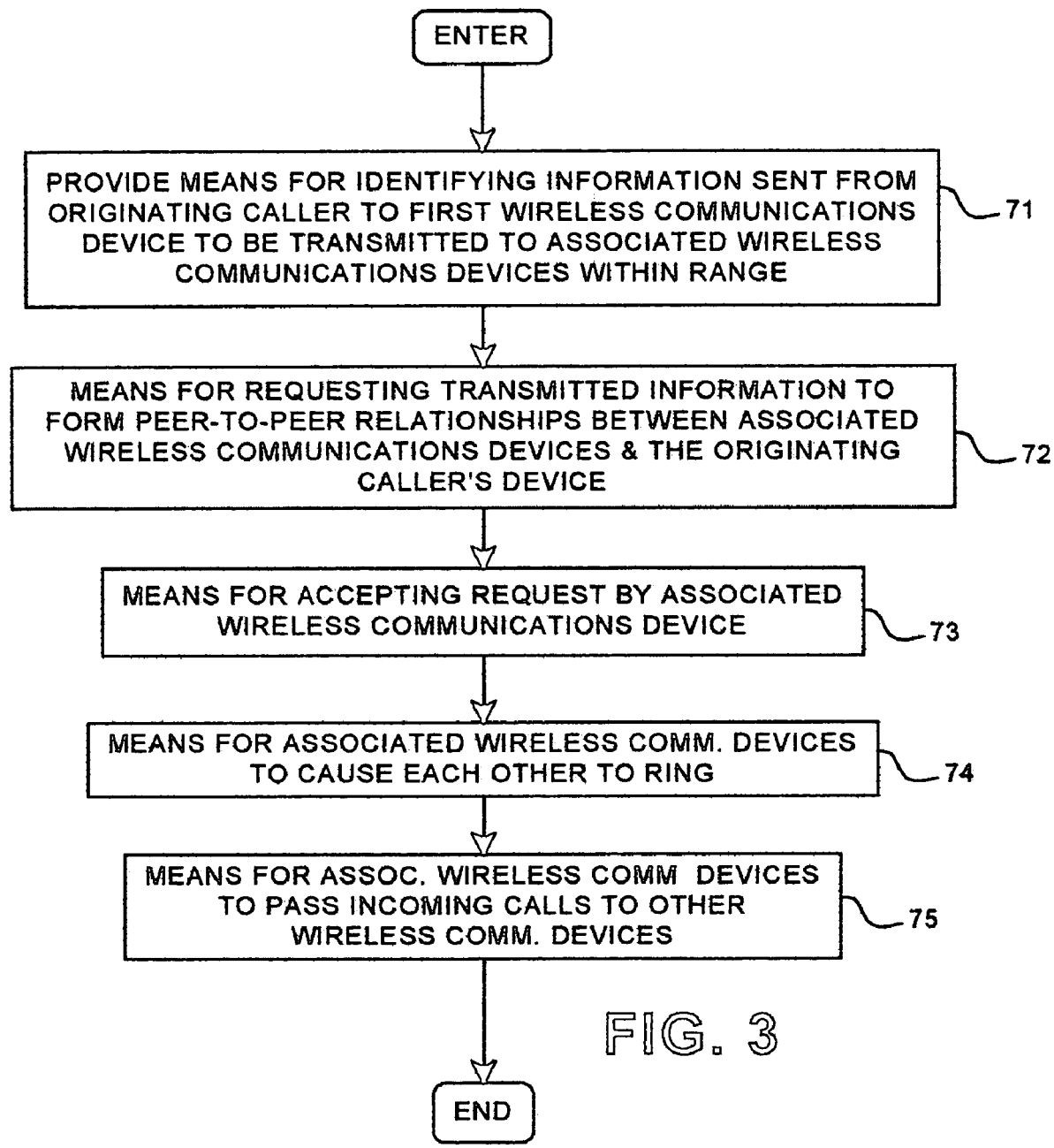
FIG. 3 is an illustrative flowchart describing the setting up of the elements needed for the program according to the present invention for coordinating cellular phones in a residential setting.

With reference to the programming shown in FIG. 3, there will be described how the system and programs of the present invention are set up. The present invention provides means for identifying information sent from an originating caller to a first wireless communications device to be transmitted to associated wireless communications devices within range, step 71. There also exists means for requesting transmitted information to form peer-to-peer relationships between associated wireless communications devices and the originating caller's device, step 72. Means for accepting or granting the request by the associated wireless communications device, step 73. Means for associated wireless communications devices to cause each other to ring, step 74. Means for associated wireless communications devices to pass incoming calls to other wireless communications devices, step 75.

Figure 4:
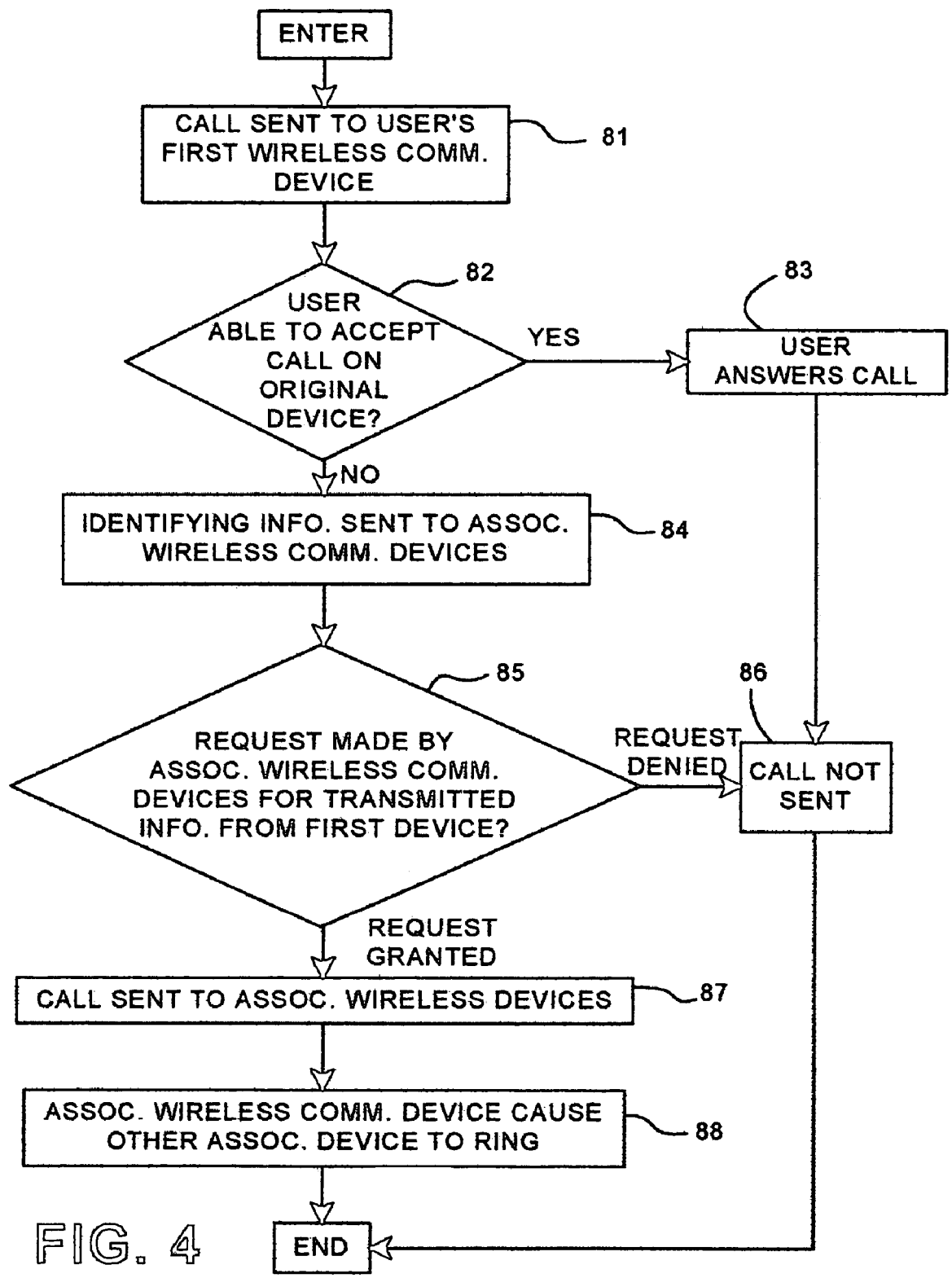
FIG. 4 is a flowchart of an illustrative simplified run of the program set up according to FIG. 3.

With reference to the flowchart of FIG. 4, a simplified illustrative run of the process set up in FIG. 2 will be described. In a wireless telecommunications system for coordinating cellular telephones in a residential setting, an original call is sent to the user's wireless communication device, step 81. A determination is made regarding whether the user is able to answer the call, step 82. If Yes, the call is answered and the process ends, step 83. If the user is unable to answer the call sent to the first wireless communication device, identifying information is sent from one the first wireless communication device to associated wireless communications devices, step 84. A request is made by the associated wireless communications devices for transmitted information from the first wireless communications device, step 85. If the request is denied, the call is not sent to the associated wireless communications devices and the process is ended without the call being answered, step 86. If the request is granted, the call is sent to the associated wireless communications devices, step 87. There exists means for associated wireless communications devices to cause other associated wireless communications devices to ring, step 88. Associated wireless communications devices can also pass incoming calls to other devices, wireless or not. The present invention uses a short range frequency in the range of 2.4-5.8 GHz. Calls can be answered by associated computers within range. All communicating handsets related to associated wireless communication devices have means to join a call, unless the user activates the privacy feature and limits certain handsets from joining the call.

Although certain preferred embodiments have been shown and described, it will be understood that many changes and modifications may be made therein without departing from the scope and intent of the appended claims.

We claim:

1. In a wireless telephonic communications system, a method, comprising:
   having a short range RF broadcast station in a residential area;
   receiving said short range RF signals by a set of wireless devices in said residential area configured to alert all devices in the set to receive a call sent to any device in the set, each device adapted for receiving said short range RF signals, from said broadcast station;
   coordinating the set of wireless devices in the residential area;
   identifying information sent from a first device to an other device within said RF broadcast range via said station;
   requesting transmitted information by the first device to form peer-to-peer relationship between said other device and first said device; and
   accepting said request by the other device;
   configuring the other device to pass incoming calls to devices within said RF broadcast range;
   broadcasting cellulary from a location within said RF range;
   allowing all communicating handsets related to said other devices to join a call;
   preventing handsets from joining a call via a privacy feature; and
   allowing calls to be answered by a VOIP capable device within said RF broadcast range of the first device.

2. The method for coordinating a set of wireless devices in a residential area of claim 1 wherein calls can be answered by a computer within said RF broadcast range of the first device.

3. A computer readable medium storing a computer program which when executed performs the implementation for telecommunicating through wireless cellular telephone systems, comprising:
   a short range RF broadcast station in a residential area;
   a set of wireless devices in said residential area configured to alert all devices in the set to receive a call sent to any device in the set, each device adapted for receiving said short range RF signals from said broadcast station;
   coordinating the set of wireless devices in the residential area;
   identifying information sent from a first device to an other device within said RF broadcast range via said station;
   requesting by the first device transmitted information to form peer-to-peer relationship between said other device and first said device; and
   accepting said request by the other device;
   configuring the other device to pass incoming calls to devices within said RF broadcast range;
   broadcasting cellularly from a location within said RF range;
   allowing all communicating handsets related to said other devices to join a call;
   preventing handsets front joining a call via a privacy feature; and allowing calls to be answered by a VOIP capable device within said RF broadcast range of the first device.

* * * * *